Dec. 30, 1969     L. HITRE     3,486,267
DRUM SETLINE
Filed April 17, 1968
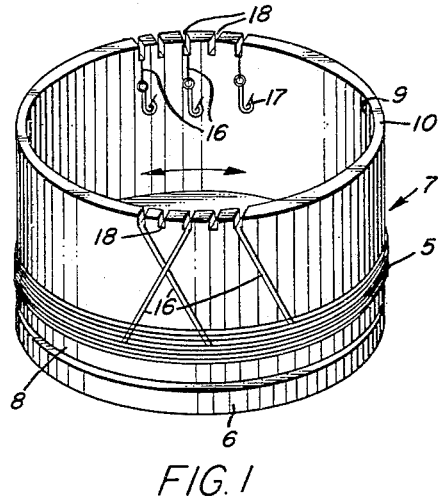
FIG. 1
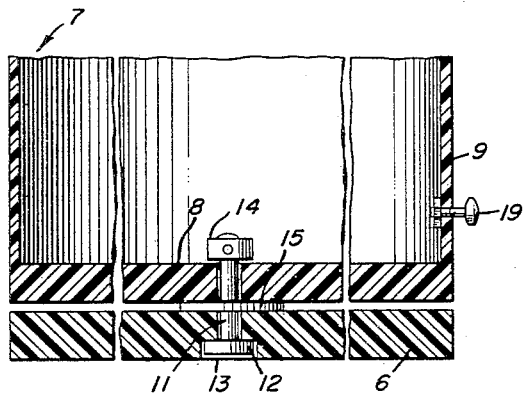
FIG. 2
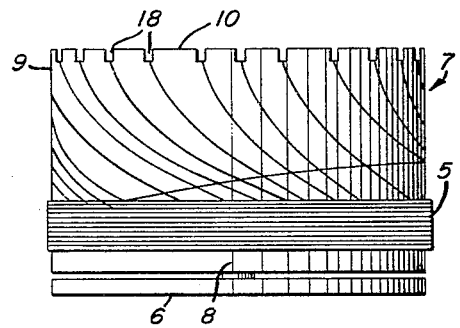
FIG. 3
FIG. 4
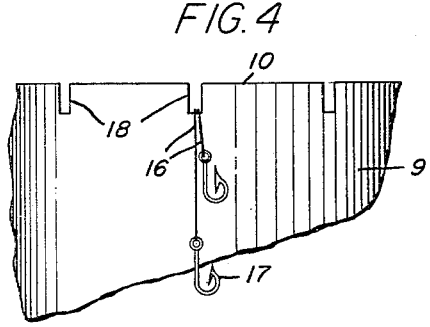
INVENTOR.
LOUIS HITRE United States Patent Office 3,486,267
Patented Dec. 30, 1969

3,486,267
DRUM SETLINE
Louis Hitre, 2448 W. Leland, Chicago, Ill. 60625
Filed Apr. 17, 1968, Ser. No. 729,480
Int. Cl. A01k 97/00
U.S. Cl. 43—54.5                                    1 Claim

ABSTRACT OF THE DISCLOSURE

A setline wound on a drum open at one end and axially mounted on a stationary base for both clockwise and counterclockwise rotation, such drum having a plurality of circumferentially spaced, open-ended slots in its cylindrical wall for removably receiving hook lines, as snells, leading fromthe setline, hooks on the snell lines being baited while suspended within the drum and before the setline is pulled out.

---

The present invention is related to fishing and more particularly to setline fishing, the main objective of the invention being the provision of a setline which is easy and simple to use and is a valuable asset to noncommercial as well as commercial fishermen.

Another object of the invention is the provision of a setline carrying hooks and wound on a reel in a manner as to never get tangled.

Another and important object of the invention is the provision of means whereby bait can be placed on snelled hooks of a setline wound on a rotatable drum previously to pulling out the setline.

A further object of the invention is the provision of a setline of particular advantage in fishing any body of water whether it be a lake, river, canal or a channel.

And, a still further object of the invention is the provision of a setline having a 10 to 100 hook drum providing a reel on which the line is wound.

Other objects and advantages of the invention will become apparent from a consideration of the following detailed description taken in connection with the accompanynig drawing wherein a satisfactory embodiment of the invention is shown. However, it is to be understood that the invention is not limited to the details disclosed but includes all such variations and modifications as fall within the spirit of the invention.

In the drawing:

FIGURE 1 is a perspective view of the invention illustrating a plurality of snelled hooks in position for baiting with their respective snells leading to a setline wound on the drum.

FIGURE 2 is a central vertical sectional view of the lower portion of the drum and base upon which the drum is rotatably mounted.

FIGURE 3 is a view in elevation of the drum showing the setline wound thereon and snells leading from the setline to and through slots in the peripheral upper edge of the drum.

And, FIGURE 4 is a fragmentary detail showing a plurality of snelled hooks in one slot.

In the drawing similar reference numerals refer to similar parts throughout the different views.

Numeral 5 designates a setline wound on a reel comprising a stationary base 6 and a drum shown generally at 7, the drum including a bottom 8, a cylindrical wall 9 and is open at the top, the top edge of the wall 9 being indicated at 10. The base 6 and drum 7 may be of any suitable material, preferably of plastic, as shown, with the bottom 8 and wall 9 integrally formed. The drum 7 is mounted on the base 6 to turn freely about an axis perpendicular to the base.

Any preferred pivotal connection between the drum and the base may be employed. Such connection, as illustrated in the drawing, embodies a bolt 11 extending axially through aligned openings in the base 6 and cylinder bottom 8, the base 6 being recessed to receive the head 12 of the bolt while pinned to the threaded end of the bolt is a retaining nut 14, a washer 15 interposed between the bottom 8 and base 6 providing a bearing for the drum 7 which permits free rotation of the latter.

Shells 16, also referred to as hook lines, have connection at one end to the setline 5 and are tied in the usual manner at its other end to a hook or hoks 17, the hook ends of such lines 16 removably engaging through slots 18, of which there may be from ten to one hundred, these slots 18 being in the cylinder wall 9 and opening through its peripheral edge 10, the hooks 17 being suspended within the cylinder and against its inner face.

From the foregoing it will readily be observed that this invention is of simple construction and easy to use. The setline 5 is wrapped on the drum 7 and only snell lines 16 with hooks 17 attached are placed in respective slots 18.

Bait can be placed on the hooks before the line 5 is pulled out. The line 5 is tied out short and may have connected thereto, but which is not shown, any preferred visual or audible bite indicating signal. Seen at 19 in FIGURE 2 is a knob extending outwardly from the bottom end of the drum 7, one end of the setline 5 being attached to this knob.

What I claim is:

1. In a drum setline, a setline, a supporting base, a drum mounted upon said base to turn in either direction about an axis perpendicular to said base, said drum comprising a cylindrical member including a cylindrical sidewall and a circular bottom wall adjacent the lower edges of said cylindrical sidewall, an upper edge of said cylindrical sidewall defining an opening into a central interior of said drum, said setline being wound around the outer side of said cylindrical sidewall of said drum, a plurality of sapced apart hook lines, such as snells, each being attached at one end to said setline, hooks on the free ends of said hook lines and means of said cylindrical sidewall for removably supporting said snells with said hooks supported thereon, said means comprising a plurality of circumferentially spaced apart slots along said upper edge of said cylindrical sidewall, said snell hook lines being draped over said slots with said hooks depending into said drum, said base comprising a stationary member, the axis about which said drum rotates comprising a bolt extending from said base to said bottom wall of said drum, said bolt carrying a washer interposed between said drum bottom wall and said base to provide a bearing surface for said drum, and said drum being of an axial length which is generally approximately equal to the diameter thereof whereby that portion of said snell hook lines further depending from over said slots has sufficient vertical room for freely depending without engaging said bottom wall.

References Cited

UNITED STATES PATENTS 2,629,197   2/1953   Duvall _____ 43—54.5
3,005,281   10/1961  Reitzammer _____ 43—54.5

WARNER H. CAMP, Primary Examiner